United States Patent
Ang et al.

(10) Patent No.: US 8,755,964 B2
(45) Date of Patent: Jun. 17, 2014

(54) HYBRID VEHICLE

(75) Inventors: Wanleng Ang, Okazaki (JP); Yoshinobu Sugiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/883,633

(22) PCT Filed: Jan. 24, 2011

(86) PCT No.: PCT/JP2011/051199
§ 371 (c)(1),
(2), (4) Date: May 6, 2013

(87) PCT Pub. No.: WO2012/101735
PCT Pub. Date: Aug. 2, 2012

(65) Prior Publication Data
US 2013/0297129 A1    Nov. 7, 2013

(51) Int. Cl.
*G06F 7/00* (2006.01)
*B60W 20/00* (2006.01)
*B60W 10/06* (2006.01)
*B60W 10/08* (2006.01)

(52) U.S. Cl.
CPC ............. *B60W 20/00* (2013.01); *Y02T 10/7005* (2013.01); *B60W 10/06* (2013.01); *B60W 10/08* (2013.01); *Y02T 90/14* (2013.01); *Y10S 903/903* (2013.01); *Y10S 903/93* (2013.01)
USPC ........ 701/22; 903/903; 903/930; 180/65.265; 307/9.1; 713/300; 713/320; 713/321; 713/323; 714/14; 714/22

(58) Field of Classification Search
CPC ..... B60W 20/00; B60W 10/06; B60W 10/00; Y02T 10/70; Y02T 90/14
USPC ................... 701/22; 713/300, 320, 321, 323; 327/33, 143, 205, 345; 375/130, 139, 375/142, 146, 150; 365/149, 189.05, 226; 714/14, 22; 380/34; 455/522; 903/903, 903/930; 180/65.265; 307/9.1
See application file for complete search history.

(56) References Cited

U.S. PATENT DOCUMENTS

| | | | |
|---|---|---|---|
| 6,683,440 B2 * | 1/2004 | Kawakami et al. | 320/133 |
| 8,395,355 B2 * | 3/2013 | Kaita et al. | 320/134 |
| 2010/0100264 A1 | 4/2010 | Kato | |
| 2010/0185349 A1 * | 7/2010 | Harada et al. | 701/22 |
| 2013/0234503 A1 * | 9/2013 | Ichikawa | 307/9.1 |

FOREIGN PATENT DOCUMENTS

| | | |
|---|---|---|
| AT | 507916 A2 | 9/2010 |
| JP | A-2004-236472 | 8/2004 |
| JP | A-2004-282837 | 10/2004 |
| JP | A-2007-062640 | 3/2007 |
| JP | A-2010-274687 | 12/2010 |

* cited by examiner

*Primary Examiner* — McDieunel Marc
(74) *Attorney, Agent, or Firm* — Oliff PLC (57) ABSTRACT

An outlet is provided to output power stored in a power storage device as commercial power, and the outlet receives power supply from the power storage device via a voltage converter. A car navigation device is configured to store information about traveling of a vehicle to a destination. An ECU obtains the information about traveling to the destination from the car navigation device, and controls a state of charge of the power storage device based on the information up to the destination and a usage status of the outlet up to the destination.

18 Claims, 4 Drawing Sheets

HYBRID VEHICLE

TECHNICAL FIELD

The present invention relates to a hybrid vehicle, and in particular to a hybrid vehicle capable of outputting power stored in a power storage device as commercial power.

BACKGROUND ART

Japanese Patent Laying-Open No. 2004-282837 discloses a power supply device for a vehicle capable of supplying commercial alternating-current (AC) power from a vehicle-mounted power source to an outlet provided inside the vehicle. In the power supply device for the vehicle, power which can be supplied from a high-voltage battery mounted in the vehicle to the outlet via an inverter, that is, allowable power consumption which can be consumed by an electrical product connected to the outlet, is calculated based on a state of charge (SOC) of the high-voltage battery. If the SOC is lower than a predetermined value, the allowable power consumption decreases in a stepwise manner as the SOC decreases.

It is described that, with such a configuration, use of the outlet can be ensured as much as possible while suppressing a reduction in the SOC of the vehicle-mounted power source.

When the SOC of a vehicle-mounted power source is reduced to a predetermined lower limit value, a vehicle-mounted outlet cannot be used. Although it is possible in a hybrid vehicle to allow an outlet to be used by generating power using an internal combustion engine, it is undesirable to start the internal combustion engine to use the outlet. Thus, it is desired to allow the outlet to be used, at least until the vehicle reaches a destination, without starting the internal combustion engine to use the outlet. Although the power supply device for the vehicle described above ensures use of the outlet as much as possible while suppressing a reduction in the SOC of the vehicle-mounted power source, the outlet cannot be used when the SOC is reduced to a predetermined lower limit value.

The present invention has been made to solve such a problem, and one object of the present invention is to provide a hybrid vehicle which allows an outlet to be used until the vehicle reaches a destination, without starting an internal combustion engine to use the outlet.

Solution to Problem

According to the present invention, a hybrid vehicle includes a rechargeable power storage device, an internal combustion engine, at least one motor, a power output device, an information appliance, and a control device. The at least one motor has a power generation function for supplying power to the power storage device by being driven by the internal combustion engine, and a function of generating a traveling drive force. The power output device is provided for outputting the power stored in the power storage device as commercial power. The information appliance is configured to store information about traveling of the vehicle to a destination. The control device controls a state of charge of the power storage device based on the information up to the destination and a usage status of the power output device up to the destination.

Preferably, the control device estimates a used power amount of the power output device to be used until the vehicle reaches the destination, based on the information up to the destination and the usage status of the power output device, and controls the state of charge of the power storage device based on an estimation result.

More preferably, the control device estimates the used power amount of the power output device to be used until the vehicle reaches the destination, based on output power from the power output device and a time required to reach the destination.

Preferably, the hybrid vehicle further includes an input device for allowing a user to input used power of the power output device. The control device estimates the used power amount of the power output device to be used until the vehicle reaches the destination, based on the used power input via the input device and a time required to reach the destination.

Preferably, the control device further controls switching of a traveling mode including a first mode (CD mode) in which traveling using only the at least one motor with the internal combustion engine being stopped is prioritized, and a second mode (CS mode) in which the internal combustion engine is operated to maintain the state of charge of the power storage device at a predetermined target. If a residual capacity of the power storage device becomes lower than a second threshold value (S2) which is higher than a first threshold value (S1) indicating a lower limit of the residual capacity by the used power amount, the control device sets the traveling mode to the second mode.

More preferably, in a period from when the residual capacity becomes lower than the second threshold value to when the vehicle reaches the destination, the control device changes a target for the residual capacity such that the residual capacity gradually decreases in accordance with the usage status of the power output device.

Further, according to the present invention, a control method is a control method for a hybrid vehicle. The hybrid vehicle includes a rechargeable power storage device, an internal combustion engine, at least one motor, a power output device, and an information appliance. The at least one motor has a power generation function for supplying power to the power storage device by being driven by the internal combustion engine, and a function of generating a traveling drive force. The power output device is provided for outputting the power stored in the power storage device as commercial power. The information appliance is configured to store information about traveling of the vehicle to a destination. The control method includes the steps of estimating a used power amount of the power output device to be used until the vehicle reaches the destination, based on the information up to the destination and a usage status of the power output device, and controlling a state of charge of the power storage device based on an estimation result.

Preferably, the step of estimating includes the step of estimating the used power amount of the power output device to be used until the vehicle reaches the destination, based on output power from the power output device and a time required to reach the destination.

Preferably, the hybrid vehicle can switch a traveling mode including a first mode (CD mode) in which traveling using only the at least one motor with the internal combustion engine being stopped is prioritized, and a second mode (CS mode) in which the internal combustion engine is operated to maintain the state of charge of the power storage device at a predetermined target. The control method further includes the steps of comparing a residual capacity of the power storage device with a second threshold value (S2) which is higher than a first threshold value (S1) indicating a lower limit of the residual capacity by the used power amount, and, if the residual capacity becomes lower than the second threshold value, setting the traveling mode to the second mode.

More preferably, the control method further includes the step of changing a target for the residual capacity, in a period from when the residual capacity becomes lower than the second threshold value to when the vehicle reaches the destination, such that the residual capacity gradually decreases in accordance with the usage status of the power output device.

Advantageous Effects of Invention

In the present invention, the power output device for outputting the power stored in the power storage device as commercial power, and the information appliance configured to store information about traveling of the vehicle to a destination are provided. Since the state of charge of the power storage device is controlled based on the information up to the destination and the usage status of the power output device up to the destination, the power output device can be used until the vehicle reaches the destination. Therefore, according to the present invention, the power output device can be used until the vehicle reaches the destination, without starting the internal combustion engine to use the power output device.

DESCRIPTION OF EMBODIMENTS

Hereinafter, an embodiment of the present invention will be described in detail with reference to the drawings, in which identical or corresponding parts will be designated by the same reference numerals, and the description thereof will not be repeated.

Figure 1:
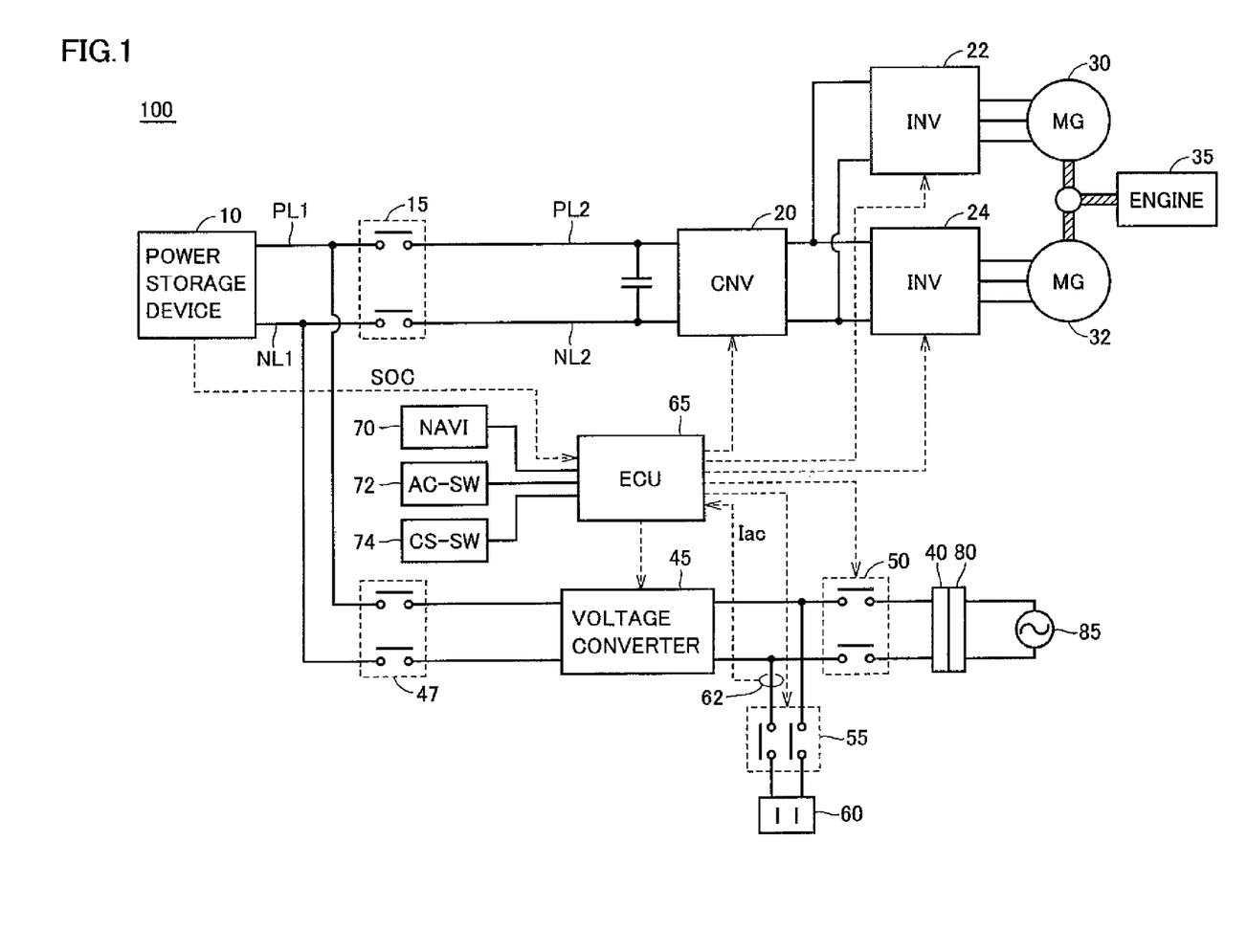
FIG. 1 is an overall block diagram of a hybrid vehicle in accordance with an embodiment of the present invention.

FIG. 1 is an overall block diagram of a hybrid vehicle in accordance with an embodiment of the present invention. Referring to FIG. 1, a hybrid vehicle 100 includes a power storage device 10, a system main relay (hereinafter referred to as an "SMR") 15, a boost converter 20, inverters 22 and 24, motor generators 30 and 32, and an engine 35. Hybrid vehicle 100 also includes a charge inlet 40, a voltage converter 45, relays 47, 50, and 55, an outlet 60, a current sensor 62, and an ECU (Electronic Control Unit) 65. Hybrid vehicle 100 further includes a car navigation device 70, an AC switch 72, and a CS mode switch 74.

Power storage device 10 is a rechargeable direct-current (DC) power source, and is composed of, for example, a secondary battery such as a nickel hydride battery and a lithium ion battery, or a large-capacity capacitor. When the SOC of power storage device 10 is reduced, power storage device 10 is charged by receiving power generated by motor generator 30 driven by engine 35. During braking of the vehicle and during acceleration reduction on a descending slope, power storage device 10 is also charged by receiving power generated by motor generator 32. Further, by using voltage converter 45 as a charger, power storage device 10 is charged by a power source 85 external to the vehicle (hereinafter referred to as an "external power source") (hereinafter, charging of power storage device 10 by external power source 85 will be referred to as "external charging").

Then, power storage device 10 outputs stored power to boost converter 20. Further, by using voltage converter 45 as a DC/AC converter, power storage device 10 can also supply power to outlet 60 via voltage converter 45. In addition, power storage device 10 calculates the SOC based on detection values of a voltage sensor and a current sensor not shown, and outputs SOC information including the calculated value to ECU 65.

SMR 15 is provided between power storage device 10 and boost converter 20. SMR 15 enters an ON state when a vehicle system is activated to cause hybrid vehicle 100 to travel. Boost converter 20 boosts input voltages of inverters 22 and 24 to be not less than a voltage of power storage device 10, based on a control signal from ECU 65. Boost converter 20 is composed of, for example, a current reversible chopper circuit.

Inverters 22 and 24 are connected to boost converter 20 in parallel with each other. Inverter 22 drives motor generator 30 based on a control signal from ECU 65. Inverter 24 drives motor generator 32 based on a control signal from ECU 65. Each of inverters 22 and 24 is composed of, for example, a three-phase PWM inverter including switching elements for three phases.

Each of motor generators 30 and 32 is a motor generator that can perform a power running operation and a regenerative operation, and is composed of, for example, a three-phase AC synchronous motor generator having a permanent magnet embedded in a rotor. Motor generator 30 is driven by inverter 22, and, for example, generates starting torque for engine 35 to start engine 35. After engine 35 is started, motor generator 30 is driven by engine 35 and generates power. Motor generator 32 is driven by inverter 24, and, for example, generates drive torque for traveling to drive drive wheels (not shown). During braking of the vehicle and the like, motor generator 32 receives kinetic energy of the vehicle from the drive wheels, and generates power.

Engine 35 converts heat energy produced by combustion of a fuel into kinetic energy of moving parts such as a piston and a rotor, and outputs the converted kinetic energy to at least one of motor generator 30 and the drive wheels.

Charge inlet 40 is configured to be capable of fitting a connector 80 to be connected to external power source 85. During external charging, charge inlet 40 receives power supplied from external power source 85, and outputs it to voltage converter 45. Instead of charge inlet 40, a charge plug configured to be capable of being connected to an outlet of external power source 85 may be provided.

Voltage converter 45 is configured to receive power from external power source 85 and charge power storage device 10. Specifically, voltage converter 45 is connected to power source lines PL1 and NL1 wired between power storage device 10 and SMR 15, via relay 47. During external charging, voltage converter 45 converts the power supplied from external power source 85 into charging power for power storage device 10, based on a control signal from ECU 65. Further, voltage converter 45 is configured to be capable of converting a voltage bi-directionally, and can convert the power received from power storage device 10 to have a commercial AC voltage and output it to outlet 60. Voltage converter 45 is composed of, for example, an AC/DC converter which can convert a voltage bi-directionally.

Relay 50 is provided between charge inlet 40 and voltage converter 45. Relay 55 has one end connected to an electric path between voltage converter 45 and relay 50, and the other end connected to outlet 60. Relays 50 and 55 are operated in response to commands from ECU 65. Specifically, during external charging, relays 50 and 55 are on and off, respectively. During power supply from power storage device 10 to outlet 60, relays 50 and 55 are off and on, respectively. Outlet 60 is configured to fit a power source plug of a home electric appliance or the like. Current sensor 62 detects a current Iac output from outlet 60, and outputs the detection value to ECU 65.

Car navigation device 70 is configured to store information about traveling to a destination. Specifically, car navigation device 70 is configured such that an operator can input a destination, and has information such as a route, a time required, and a distance from a present location to the destination. Car navigation device 70 outputs the information about traveling to the destination to ECU 65.

AC switch 72 is configured to be operable by a user to allow outlet 60 to be used. When AC switch 72 is turned on by the user, relays 47, 50, and 55 are turned on, off, and on, respectively, and power can be supplied from power storage device 10 to outlet 60.

CS mode switch 74 is configured such that a driver can request traveling in a CS (Charge Sustaining) mode. Hybrid vehicle 100 has a traveling mode including a CD (Charge Depleting) mode and the CS mode. The CD mode refers to a traveling mode in which traveling using only motor generator 32 with engine 35 being stopped is prioritized. On the other hand, the CS mode refers to a mode for traveling with engine 35 being operated as appropriate to maintain the SOC of power storage device 10 at a predetermined target.

It is to be noted that, even in the CD mode, if the driver strongly depresses an accelerator pedal, or during operation of an engine-driven type air conditioner, during engine warm-up, or the like, engine 35 is allowed to be operated. The CD mode is a traveling mode in which the vehicle, travels basically using power stored in power storage device 10 as an energy source, without maintaining the SOC of power storage device 10. During the CD mode, discharging often eventually accounts for a relatively larger percentage than charging. On the other hand, the CS mode is a traveling mode in which engine 35 is operated as necessary to cause motor generator 30 to generate power in order to maintain the SOC of power storage device 10 at the predetermined target. The CS mode is not limited to traveling with engine 35 being always operated.

Specifically, even when the traveling mode is set to the CD mode, if the accelerator pedal is strongly depressed and large vehicle power is requested, engine 35 is operated. Further, even when the traveling mode is set to the CS mode, if the SOC is higher than a target value, engine 35 is stopped. Accordingly, irrespective of the traveling mode, traveling by stopping engine 35 and using only motor generator 32 will be referred to as "EV traveling", and traveling by operating engine 35 and using motor generator 32 and engine 35 will be referred to as "HV traveling".

ECU 65 is composed of an electronic control unit, and controls operations of SMR 15, boost converter 20, inverters 22 and 24, voltage converter 45, and relays 47, 50, and 55, by software processing performed by executing a prestored program in a CPU and/or hardware processing performed by a dedicated electronic circuit.

Here, ECU 65 controls the SOC of power storage device 10 based on the above information up to the destination received from car navigation device 70 and a usage status of outlet 60. As an example, ECU 65 estimates a used power amount of outlet 60 to be used until the vehicle reaches the destination, based on output power (actual usage) from outlet 60 and a time required to reach the destination, and controls the SOC up to the destination based on an estimation result.

Figure 2:
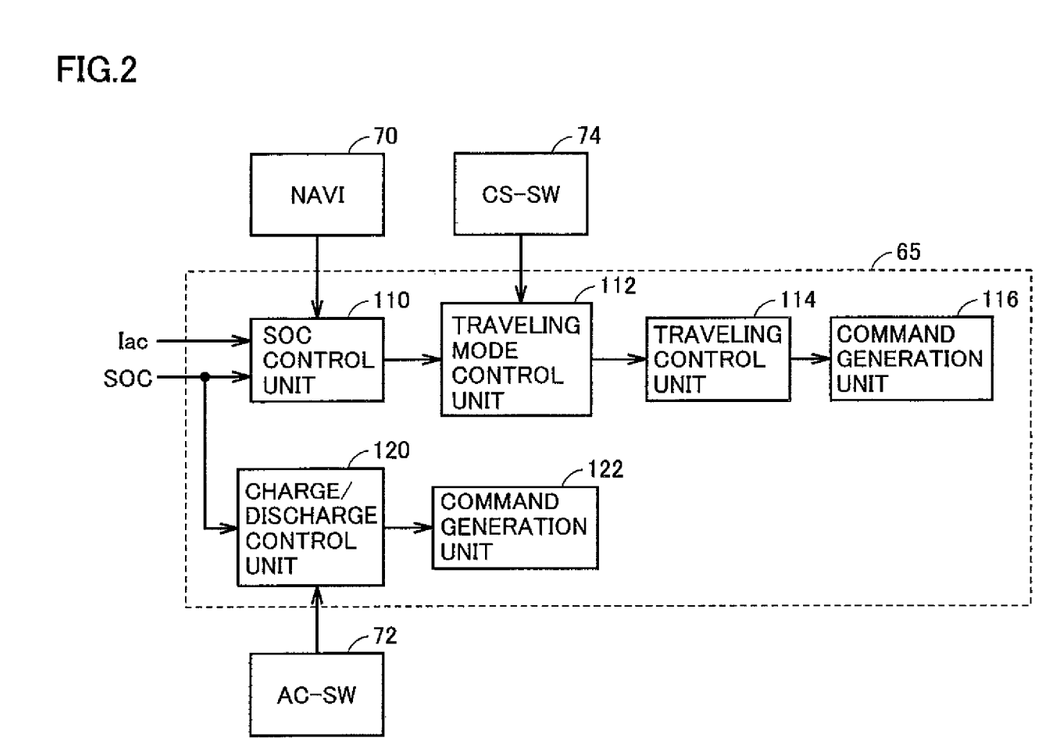
FIG. 2 is a functional block diagram for illustrating main functions of an ECU.

FIG. 2 is a functional block diagram for illustrating main functions of ECU 65. Referring to FIG. 2, ECU 65 includes an SOC control unit 110, a traveling mode control unit 112, a traveling control unit 114, command generation units 116 and 122, and a charge/discharge control unit 120.

SOC control unit 110 performs processing for controlling the SOC of power storage device 10 (FIG. 1). Specifically, SOC control unit 110 obtains the SOC information from power storage device 10, and calculates a residual capacity (Wh) of power storage device 10 based on the obtained SOC information. Further, SOC control unit 110 obtains the time required to reach the destination from car navigation device 70, and also obtains the detection value of current sensor 62 to calculate the output power (W) of outlet 60. The output power of outlet 60 indicates the usage status of outlet 60, and may be output power at that point of time, or may be an average value from the start of traveling, or the like. Alternatively, a maximum power that can be output from outlet 60 can be set as the output power described above.

Then, SOC control unit 110 estimates the used power amount (Wh) of outlet 60 to be used until the vehicle reaches the destination, based on the output power of outlet 60 and the time required to reach the destination. Specifically, SOC control unit 110 calculates the used power amount of outlet 60 to be used until the vehicle reaches the destination, by multiplying the output power of outlet 60 by the time required to reach the destination. Subsequently, SOC control unit 110 compares a threshold value obtained by adding the calculated used power amount to a predetermined lower limit value of the residual capacity, with the residual capacity of power storage device 10, and, if the residual capacity of power storage device 10 becomes lower than the threshold value, SOC control unit 110 requests traveling in the CS mode to traveling mode control unit 112.

Further, if the residual capacity of power storage device 10 becomes lower than the threshold value, SOC control unit 110 calculates a SOC target in a case where the vehicle travels to the destination in the CS mode. Specifically, SOC control unit 110 changes the SOC target such that the residual capacity gradually decreases from the threshold value to the lower limit value in accordance with the output power (W) of outlet 60. In this regard, a description will be given later with reference to FIG. 3.

Traveling mode control unit 112 controls the traveling mode (CD mode/CS mode). When external charging is finished, traveling mode control unit 112 sets the traveling mode to the CD mode. Further, if traveling mode control unit 112 receives a request for traveling in the CS mode from SOC control unit 110, traveling mode control unit 112 switches the traveling mode to the CS mode when the vehicle travels in the CD mode. Furthermore, if traveling in the CS mode is requested by CS mode switch 74, traveling mode control unit 112 sets the traveling mode to the CS mode.

Traveling control unit 114 performs actual traveling control in accordance with the traveling mode controlled by traveling mode control unit 112. Specifically, in the CD mode, traveling control unit 114 controls motor generator 32 such that the vehicle will travel using only motor generator 32 with engine 35 being stopped. Further, in the CS mode, traveling control unit 114 controls engine 35 and motor generators 30, 32 such that the vehicle will travel using engine 35 and motor generator 32 with engine 35 being operated and power storage device 10 being charged by motor generator 30.

It is to be noted that, even in the CD mode, if a large traveling drive force is requested by depressing the accelerator pedal, traveling control unit 114 starts engine 35 (HV traveling). On the other hand, even in the CS mode, if the residual capacity is higher than a target value, traveling control unit 114 stops engine 35 (EV traveling).

Command generation unit 116 generates control signals for driving engine 35 and inverters 22 and 24 in accordance with a command from traveling control unit 114, and outputs the generated control signals to engine 35 and inverters 22 and 24.

Charge/discharge control unit 120 controls external charging by external power source 85 (FIG. 1) and power supply from power storage device 10 to outlet 60. If external power source 85 is connected to charge inlet 40 and external charging is requested, charge/discharge control unit 120 turns on relay 47, turns on relay 50, and turns off relay 55, and controls voltage converter 45 such that power storage device 10 is charged by external power source 85. Further, if AC switch 72 is turned on by the user, charge/discharge control unit 120 turns on relay 47, turns off relay 50, and turns on relay 55, and controls voltage converter 45 such that power is supplied from power storage device 10 to outlet 60.

Command generation unit 122 generates a control signal for driving voltage converter 45 in accordance with a command from charge/discharge control unit 120, and outputs the generated control signal to voltage converter 45.

Figure 3:
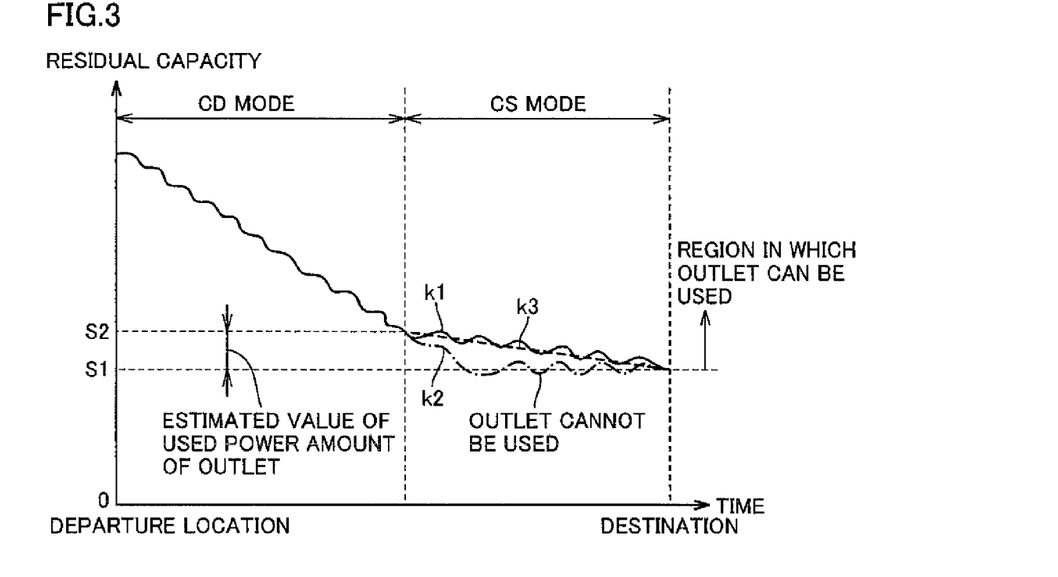
FIG. 3 is a view showing one example of changes in a residual capacity of a power storage device.

FIG. 3 is a view showing changes in the residual capacity of power storage device 10. It is to be noted that FIG. 3 shows one example, although it is a typical example, and changes in the residual capacity are not limited to those shown in FIG. 3. Referring to FIG. 3, the axis of abscissas represents a time from a departure location. A solid line k1 indicates changes in the residual capacity in the present embodiment, and a dotted line k2 indicates changes in the residual capacity in conventional art as a comparative example.

It is assumed that external charging has been performed at the departure location and the vehicle starts traveling with sufficient residual capacity. Basically, power stored in power storage device 10 by external charging is supplied to outlet 60, and power generation by driving engine 35 is not performed for the purpose of using outlet 60. Outlet 60 can be used when the residual capacity is higher than a lower limit value S1, and outlet 60 cannot be used if the residual capacity reaches lower limit value S1.

Until the residual capacity declines after the vehicle starts traveling from the departure location, the traveling mode is set to the CD mode, and the vehicle travels basically using the power stored in power storage device 10 as an energy source. Accordingly, in the CD mode, the residual capacity of power storage device 10 declines.

Here, in conventional art, the vehicle travels in the CD mode until the residual capacity reaches lower limit value S1. When the residual capacity reaches lower limit value S1, the traveling mode is switched from the CD mode to the CS mode, and thereafter the residual capacity is maintained at lower limit value S1 by operating engine 35 as appropriate until the vehicle reaches the destination. After the residual capacity reaches lower limit value S1, outlet 60 cannot be used until the vehicle reaches the destination.

Therefore, in the present embodiment, the state of charge of power storage device 10 is controlled such that outlet 60 can be used until the vehicle reaches the destination, based on destination information and the usage status of outlet 60. Specifically, the used power amount of outlet 60 to be used until the vehicle reaches the destination is estimated based on the output power from outlet 60 and the time required to reach the destination. Then, when the residual capacity reaches a threshold value S2 obtained by adding the estimated used power amount of outlet 60 to lower limit value S1 of the residual capacity, the traveling mode is switched to the CS mode. Further, a target for the residual capacity is variably set such that the target for the residual capacity gradually decreases from threshold value S2 to lower limit value S1 during traveling to the destination (a dotted line k3). The target for the residual capacity indicated by dotted line k3 has an inclination corresponding to the output power (W) from outlet 60. This prevents a situation in which the residual capacity reaches lower limit value S1 before the vehicle reaches the destination and thereby outlet 60 cannot be used, and outlet 60 can be used until the vehicle reaches the destination.

Figure 4:
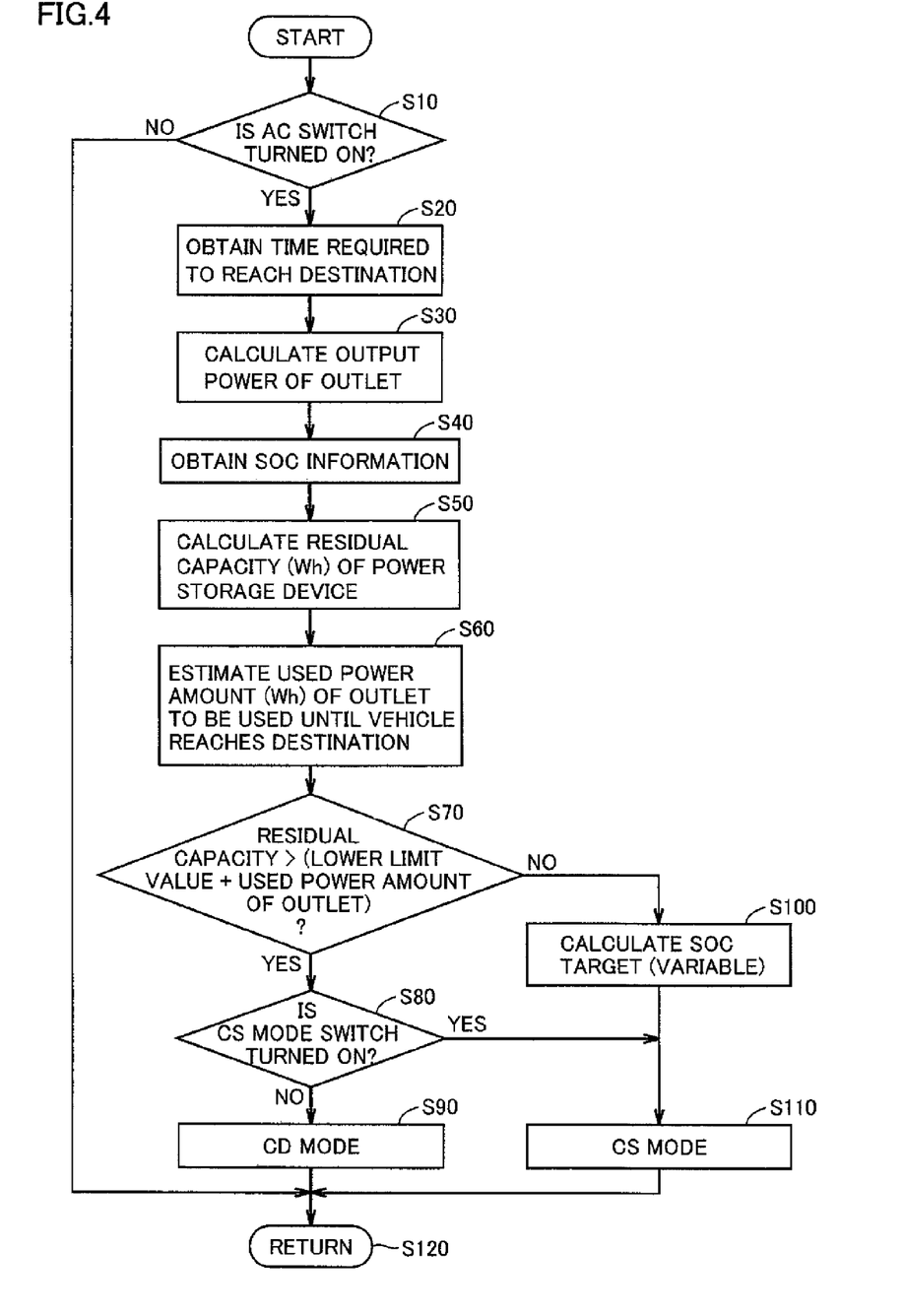
FIG. 4 is a flowchart for illustrating a procedure of processing performed by the ECU when an AC switch is turned on by a user.

FIG. 4 is a flowchart for illustrating a procedure of processing performed by ECU 65 when AC switch 72 is turned on. The processing in the flowchart is invoked from a main routine and performed at regular time intervals or whenever predetermined conditions are satisfied.

Referring to FIG. 4, ECU 65 determines whether or not AC switch 72 is turned on (step S10). If AC switch 72 is not turned on (NO in step S10), ECU 65 advances the processing to step S120 without performing subsequent steps.

If ECU 65 determines in step S10 that AC switch 72 is turned on (YES in step S10), ECU 65 obtains the time required to reach the destination from car navigation device 70 (step S20). Further, ECU 65 obtains the detection value of current sensor 62 (FIG. 1), and calculates the output power of outlet 60 (step S30). As described above, the output power of outlet 60 indicates the usage status of outlet 60, and may be output power at present, or may be an average value from the start of traveling. Alternatively, the maximum power that can be output from outlet 60 can be set as the output power described above.

Further, ECU 65 obtains the SOC information of power storage device 10 from power storage device 10 (step S40). Then, ECU 65 calculates the residual capacity (Wh) of power storage device 10 based on the obtained SOC information (step S50). Subsequently, ECU 65 estimates the used power amount (Wh) of outlet 60 to be used until the vehicle reaches the destination (step S60). Specifically, ECU 65 calculates the used power amount (Wh) of outlet 60 to be used until the vehicle reaches the destination, by multiplying the output power of outlet 60 calculated in step S30 by the time required to reach the destination obtained in step S20.

Then, ECU 65 determines whether or not the residual capacity (Wh) calculated in step S50 is higher than threshold value S2 (FIG. 3) of the residual capacity obtained by adding the used power amount of outlet 60 to be used until the vehicle reaches the destination to lower limit value S1 (FIG. 3) of the residual capacity (step S70). If ECU 65 determines that the residual capacity is higher than threshold value S2 (YES in step S70), ECU 65 determines whether or not CS mode switch 74 is turned on (step S80). If CS mode switch 74 is turned off (NO in step S80), ECU 65 sets the traveling mode to the CD mode (step S90). If CS mode switch 74 is turned on (YES in step S80), ECU 65 advances the processing to step S110.

On the other hand, if ECU 65 determines in step S70 that the residual capacity is not more than threshold value S2 (NO in step S70), ECU 65 calculates the SOC target (variable value) (step S100). Specifically, ECU 65 calculates the target for the residual capacity of power storage device 10 to follow dotted line k3 shown in FIG. 3. Then, ECU 65 sets the traveling mode to the CS mode (step S110).

As described above, in the present embodiment, hybrid vehicle 100 includes outlet 60 for outputting the power stored in power storage device 10 as commercial power, and car navigation device 70 configured to store information about traveling of the vehicle to a destination. Since the state of charge of power storage device 10 is controlled based on the information up to the destination obtained from car navigation device 70 and the usage status of outlet 60 up to the destination, outlet 60 can be used until the vehicle reaches the destination. Therefore, according to the present embodiment, outlet 60 can be used until the vehicle reaches the destination without starting engine 35 to use outlet 60.

It is to be noted that, although the above embodiment has described that the used power amount (Wh) of outlet 60 to be used until the vehicle reaches the destination is estimated based on the output power (actual usage) of outlet 60 calculated from the detection value of current sensor 62 and the time required to reach the destination, the used power amount (Wh) of outlet 60 to be used until the vehicle reaches the destination may be estimated by another technique. For example, an input device for allowing the user to input used power (W) of outlet 60 up to the destination may be provided to estimate the used power amount (Wh) of outlet 60 to be used until the vehicle reaches the destination based on the used power input via the input device and the time required to reach the destination.

Although the above embodiment has described that voltage converter 45 can perform bi-directional conversion and outlet 60 is connected between voltage converter 45 and charge inlet 40, arrangement of outlet 60 is not limited thereto. Voltage converter 45 may be exclusively used as a charger, and a DC/AC converter may be provided in addition to voltage converter 45 to supply power from power storage device 10 to outlet 60.

Further, although it has been described that external charging is performed using voltage converter 45, power storage device 10 may be charged by connecting external power source 85 to neutral points of motor generators 30 and 32 during external charging, adjusting a voltage between the neutral points by inverters 22 and 24, and thereby converting power supplied from external power source 85 to have a charging voltage.

Furthermore, although it has been described that hybrid vehicle 100 is a so-called "plug-in hybrid vehicle" that can be externally charged, the present invention is not limited to a plug-in hybrid vehicle. For example, external charging may be performed using a noncontact power supply technique such as a resonance method and electromagnetic induction, or hybrid vehicle 100 may be configured such that power storage device 10 can be charged external to the vehicle and installed to replace a used one.

In addition, although the above description has been given on a series/parallel type hybrid vehicle in which motive power of engine 35 is output to at least one of motor generator 30 and the drive wheels, the present invention is also applicable to other types of hybrid vehicles. That is, the present invention is also applicable to, for example, a so-called series type hybrid vehicle in which engine 35 is used only for driving motor generator 30 and a drive force for the vehicle is generated only by motor generator 32, and a one-motor type hybrid vehicle in which engine 35 is used as a main motive power source and assisted by a motor as necessary, and the motor can also be used as a power generator to charge power storage device 10.

It is to be noted that, in the above description, engine 35 corresponds to one embodiment of an "internal combustion engine" in the present invention, and motor generator 30, 32 corresponds to one embodiment of "at least one motor" in the present invention. Further, voltage converter 45 and outlet 60 form one embodiment of a "power output device" in the present invention, and car navigation device 70 corresponds to one embodiment of an "information appliance" in the present invention. Furthermore, ECU 65 corresponds to one embodiment of a "control device" in the present invention.

It should be understood that the embodiment disclosed herein is illustrative and non-restrictive in every respect. The scope of the present invention is defined by the scope of the claims, rather than the above description of the embodiment, and is intended to include any modifications within the scope and meaning equivalent to the scope of the claims.

REFERENCE SIGNS LIST

10: power storage device, 15: SMR, 20: boost converter, 22, 24: inverter, 30, 32: motor generator, 35: engine, 40: charge inlet, 47, 50, 55: relay, 60: outlet, 65: ECU, 70: car navigation device, 72: AC switch, 74: CS mode switch, 80: connector, 85: external power source, 100: hybrid vehicle, 110: SOC control unit, 112: traveling mode control unit, 114: traveling control unit, 116, 122: command generation unit, 120: charge/discharge control unit.

The invention claimed is:

1. A hybrid vehicle, comprising:
a rechargeable power storage device;
an internal combustion engine;
at least one motor having a power generation function for supplying power to said power storage device by being driven by said internal combustion engine, and a function of generating a traveling drive force;
a power output device for outputting the power stored in said power storage device as commercial power;
an information appliance configured to store information about traveling of the vehicle to a destination; and
a control device controlling a state of charge of said power storage device based on said information up to the destination and a usage status of said power output device up to the destination.

2. The hybrid vehicle according to claim 1, wherein said control device estimates a used power amount of said power output device to be used until the vehicle reaches the destination, based on said information up to the destination and the usage status of said power output device, and controls the state of charge of said power storage device based on an estimation result.

3. The hybrid vehicle according to claim 2, wherein said control device estimates said used power amount, based on output power from said power output device and a time required to reach the destination.

4. The hybrid vehicle according to claim 3, wherein
said control device further controls switching of a traveling mode including a first mode (CD mode) in which traveling using only said at least one motor with said internal combustion engine being stopped is prioritized, and a second mode (CS mode) in which said internal combustion engine is operated to maintain the state of charge of said power storage device at a predetermined target, and
if a residual capacity of said power storage device becomes lower than a second threshold value (S2) which is higher than a first threshold value (S1) indicating a lower limit of said residual capacity by said used power amount, said control device sets said traveling mode to said second mode.

5. The hybrid vehicle according to claim 4, wherein, in a period from when said residual capacity becomes lower than said second threshold value to when the vehicle reaches said destination, said control device changes a target for said residual capacity such that said residual capacity gradually decreases in accordance with the usage status of said power output device.

6. The hybrid vehicle according to claim 2, further comprising an input device for allowing a user to input used power of said power output device,
    wherein said control device estimates said used power amount, based on the used power input via the input device and a time required to reach the destination.

7. The hybrid vehicle according to claim 6, wherein
    said control device further controls switching of a traveling mode including a first mode (CD mode) in which traveling using only said at least one motor with said internal combustion engine being stopped is prioritized, and a second mode (CS mode) in which said internal combustion engine is operated to maintain the state of charge of said power storage device at a predetermined target, and
    if a residual capacity of said power storage device becomes lower than a second threshold value (S2) which is higher than a first threshold value (S1) indicating a lower limit of said residual capacity by said used power amount, said control device sets said traveling mode to said second mode.

8. The hybrid vehicle according to claim 7, wherein, in a period from when said residual capacity becomes lower than said second threshold value to when the vehicle reaches said destination, said control device changes a target for said residual capacity such that said residual capacity gradually decreases in accordance with the usage status of said power output device.

9. The hybrid vehicle according to claim 2, wherein
    said control device further controls switching of a traveling mode including a first mode (CD mode) in which traveling using only said at least one motor with said internal combustion engine being stopped is prioritized, and a second mode (CS mode) in which said internal combustion engine is operated to maintain the state of charge of said power storage device at a predetermined target, and
    if a residual capacity of said power storage device becomes lower than a second threshold value (S2) which is higher than a first threshold value (S1) indicating a lower limit of said residual capacity by said used power amount, said control device sets said traveling mode to said second mode.

10. The hybrid vehicle according to claim 9, wherein, in a period from when said residual capacity becomes lower than said second threshold value to when the vehicle reaches said destination, said control device changes a target for said residual capacity such that said residual capacity gradually decreases in accordance with the usage status of said power output device.

11. The hybrid vehicle according to claim 1, wherein
    said control device further controls switching of a traveling mode including a first mode (CD mode) in which traveling using only said at least one motor with said internal combustion engine being stopped is prioritized, and a second mode (CS mode) in which said internal combustion engine is operated to maintain the state of charge of said power storage device at a predetermined target, and
    if a residual capacity of said power storage device becomes lower than a second threshold value (S2) which is higher than a first threshold value (S1) indicating a lower limit of said residual capacity by said used power amount, said control device sets said traveling mode to said second mode.

12. The hybrid vehicle according to claim 11, wherein, in a period from when said residual capacity becomes lower than said second threshold value to when the vehicle reaches said destination, said control device changes a target for said residual capacity such that said residual capacity gradually decreases in accordance with the usage status of said power output device.

13. A control method for a hybrid vehicle,
    said hybrid vehicle including
    a rechargeable power storage device,
    an internal combustion engine,
    at least one motor having a power generation function for supplying power to said power storage device by being driven by said internal combustion engine, and a function of generating a traveling drive force,
    a power output device for outputting the power stored in said power storage device as commercial power, and
    an information appliance configured to store information about traveling of the vehicle to a destination,
    said control method comprising the steps of:
    estimating, by a processor, a used power amount of said power output device to be used until the vehicle reaches the destination, based on said information up to the destination and a usage status of said power output device; and
    controlling a state of charge of said power storage device based on an estimation result.

14. The control method for the hybrid vehicle according to claim 13, wherein said step of estimating includes the step of estimating said used power amount, based on output power from said power output device and a time required to reach the destination.

15. The control method for the hybrid vehicle according to claim 14, wherein
    said hybrid vehicle can switch a traveling mode including a first mode (CD mode) in which traveling using only said at least one motor with said internal combustion engine being stopped is prioritized, and a second mode (CS mode) in which said internal combustion engine is operated to maintain the state of charge of said power storage device at a predetermined target, and
    said control method further comprises the steps of:
    comparing a residual capacity of said power storage device with a second threshold value (S2) which is higher than a first threshold value (S1) indicating a lower limit of said residual capacity by said used power amount, and
    if said residual capacity becomes lower than said second threshold value, setting said traveling mode to said second mode.

16. The control method for the hybrid vehicle according to claim 15, further comprising the step of changing a target for said residual capacity, in a period from when said residual capacity becomes lower than said second threshold value to when the vehicle reaches said destination, such that said residual capacity gradually decreases in accordance with the usage status of said power output device.

17. The control method for the hybrid vehicle according to claim 13, wherein
    said hybrid vehicle can switch a traveling mode including a first mode (CD mode) in which traveling using only said at least one motor with said internal combustion engine being stopped is prioritized, and a second mode (CS mode) in which said internal combustion engine is operated to maintain the state of charge of said power storage device at a predetermined target, and
    said control method further comprises the steps of:
    comparing a residual capacity of said power storage device with a second threshold value (S2) which is higher than a first threshold value (S1) indicating a lower limit of said residual capacity by said used power amount, and if said residual capacity becomes lower than said second threshold value, setting said traveling mode to said second mode.

18. The control method for the hybrid vehicle according to claim 17, further comprising the step of changing a target for said residual capacity, in a period from when said residual capacity becomes lower than said second threshold value to when the vehicle reaches said destination, such that said residual capacity gradually decreases in accordance with the usage status of said power output device.

* * * * *